(12) United States Patent
Marz et al.

(10) Patent No.: US 10,709,910 B2
(45) Date of Patent: Jul. 14, 2020

(54) METHOD FOR THE CONTROL OF THE BREATHING GAS SUPPLY

(71) Applicant: B/E AEROSPACE SYSTEMS GMBH, Lubeck (DE)

(72) Inventors: Heiko Marz, Lubeck (DE); Thomas Sauerbaum, Gross Gronau (DE)

(73) Assignee: B/E Aerospace Systems GmbH, Lubeck (DE)

( * ) Notice: Subject to any disclaimer, the term of this patent is extended or adjusted under 35 U.S.C. 154(b) by 826 days.

(21) Appl. No.: 15/294,144

(22) Filed: Oct. 14, 2016

(65) Prior Publication Data

US 2017/0100611 A1    Apr. 13, 2017

Related U.S. Application Data

(63) Continuation-in-part of application No. 14/666,596, filed on Mar. 24, 2015, now Pat. No. 10,213,630.

(30) Foreign Application Priority Data

Apr. 9, 2014 (DE) .................. 10 2014 206 878

(51) Int. Cl.
*A62B 9/02* (2006.01)
*B64D 25/00* (2006.01)
(Continued)

(52) U.S. Cl.
CPC .............. *A62B 9/02* (2013.01); *A62B 7/02* (2013.01); *A62B 7/14* (2013.01); *A62B 18/02* (2013.01);
(Continued)

(58) Field of Classification Search
CPC ............ B64D 2231/00; B64D 2231/02; B64D 2231/025; B64D 13/00; B64D 13/02;
(Continued)

(56) References Cited

U.S. PATENT DOCUMENTS 3,429,326 A    2/1969  Arnell et al.
6,244,540 B1 *  6/2001  Stabile .................. A62B 7/14
                                                         244/118.5
(Continued)

FOREIGN PATENT DOCUMENTS

CA     2880660 A1 * 10/2015 ............... A62B 7/14
CN   101415468 A      4/2009
(Continued)

OTHER PUBLICATIONS

Anonymous: "Transactions in measurement and control, vol. 4, flow & level measurement", Dec. 31, 2001, pp. 1-116.
(Continued)

*Primary Examiner* — Joseph D. Boecker
(74) *Attorney, Agent, or Firm* — Donna P. Suchy

(57) ABSTRACT

In a preferred embodiment, methods and systems for the control of the breathing gas supply from a pressure-leading supply conduit to one or more breathing masks of an oxygen emergency supply device in a passenger aircraft include an on/off valve arranged between the supply conduit and the one or more breathing masks. The valve can be blocked or released to control air supply based upon monitoring mass flow to the breathing masks. The valve, for example, is actuated to an open position until the error between the actual mass flow and a desired mass flow exceeds a maximal error value, whereupon the valve is actuated to a closed position until the error between the actual mass flow and the desired mass flow exceeds a minimal error value whereupon the valve is actuated to the open position and the mass flow monitoring cycle is repeated.

16 Claims, 7 Drawing Sheets

(51) Int. Cl.
*A62B 7/14* (2006.01)
*A62B 18/02* (2006.01)
*A62B 7/02* (2006.01)

(52) U.S. Cl.
CPC ........ *B64D 25/00* (2013.01); *B64D 2231/025* (2013.01)

(58) Field of Classification Search
CPC .. B64D 13/06; B64D 2013/0681; A62B 7/14; A62B 9/02; A62B 18/00; A62B 18/02; A62B 18/10; A62B 25/005
See application file for complete search history.

(56) References Cited

U.S. PATENT DOCUMENTS

| | | | |
|---|---|---|---|
| 10,213,630 B2 * | 2/2019 | Marz | A62B 7/14 |
| 2010/0012123 A1 * | 1/2010 | Rittner | A62B 7/14 128/204.21 |
| 2014/0000590 A1 * | 1/2014 | Rittner | A62B 18/02 128/202.26 |

FOREIGN PATENT DOCUMENTS

| | | |
|---|---|---|
| CN | 101415606 A | 4/2009 |
| CN | 101616716 A | 12/2009 |
| CN | 105999577 A | 10/2016 |
| EP | 2 143 469 A1 | 1/2010 |
| EP | 2 004 294 | 7/2010 |
| FR | 3019750 A1 | 10/2015 |

OTHER PUBLICATIONS

Chinese Search Report for CN2015101643351, dated Oct. 13, 2017, 1 page.
First Chinese Office Action for CN201510164335.1, dated Oct. 30, 2017, 9 pages.
French Search Report for FR1552887, dated Dec. 8, 2017, 6 pages.
German Examination Report for DE102014206878.9, dated Apr. 2, 2015, 3 pages.
German Examination Report for DE102014206878.9, dated Nov. 28, 2014, 1 page.
Partial International Search Report and Provisional Opinion for International Application PCT/IB2017/056382, dated Dec. 15, 2017, 9 pages.

* cited by examiner

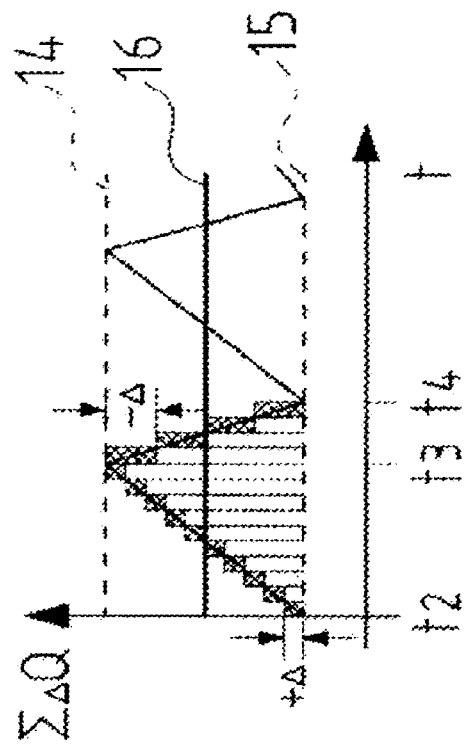 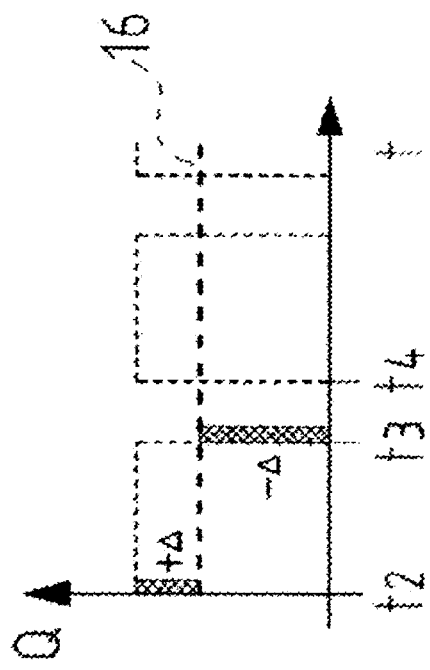
FIG. 4A
FIG. 4B

METHOD FOR THE CONTROL OF THE BREATHING GAS SUPPLY

CROSS REFERENCES TO RELATED APPLICATIONS

This application is a continuation-in-part of U.S. application Ser. No. 14/666,596, entitled "METHOD FOR THE CONTROL OF THE BREATHING GAS SUPPLY" and filed Mar. 24, 2015, which claims priority from German Patent Application No. 10 2014 206878.9, filed Apr. 9, 2014, the contents of both which are incorporated by reference in their entirety.

BACKGROUND

The present disclosure relates to a method for controlling the breathing gas supply to one or more breathing masks of an emergency oxygen supply device, as well as to a device for the emergency supply of oxygen for carrying out this method.

A pressurized cabin, in which a cabin pressure ensuring the oxygen supply to the passengers amid an adequate supply of fresh air is envisaged with today's common jet aircraft which have a cruising altitude of 10,000 m and more. Emergency oxygen supply systems, with which the passengers can also be supplied with an adequate quantity of oxygen when a case of decompression arises, thus a drop in the cabin pressure, are provided in order to be able to ensure the supply of oxygen to the passengers given such an unexpected sudden pressure drop at such an altitude. Such systems typically include either pressurized oxygen containers or chemical oxygen generators which lead the breathing gas or oxygen via a conduit system to the breathing masks envisaged for the supply of the passengers, in an adequate quantity. Thereby, the emergency oxygen system is to be designed such that an adequate oxygen supply to the passengers is ensured at the maximal flight altitude to be expected. In contrast, the oxygen requirement reduces with a falling altitude, since the oxygen share in the surrounding air increases.

One constantly strives to keep the quantity of oxygen or breathing gas which is to be carried along as low as possible, since it is indeed the carrying-along of oxygen, be it in pressurized containers or in generators, which entails a significant weight which must be borne by the aircraft and reduces the payload capacity. In order to achieve this, the quantity of oxygen or breathing gas which is dispensed to the breathing masks is controlled in a manner dependent on cabin pressure according to pertinent regulations. In the case of decompression, the cabin pressure largely corresponds to the surrounding air pressure which is essentially dependent on the altitude of the aircraft. The oxygen quantity which is to be fed to the passengers is a function of the cabin pressure which is a function of the altitude, is stipulated in the pertinent regulations. Thereby, one constantly strives not only to bring the oxygen quantity as close as possible to the minimum-prescribed value, in order to maintain the oxygen consumption as low as possible, but also to design technical devices which are employed as lightweight and inexpensive as possible manner.

As described in EP 2004294 B1 entitled "A Respiratory Gas Supply Circuit for an Aircraft Carrying Passengers", it is counted as belonging to the state of the art, to control the oxygen supply to the breathing masks and which is dependent on the cabin pressure, which is to say dependent on altitude, by way of an on/off valve. The control of the oxygen quantity is effected using pulse width modulation of the on/off valve.

The disadvantage thereby is that on one hand the PID (Proportional Integral Derivative) modules necessary for the production of the pulse-width modulation signal are relatively complicated, and on the other hand the energy requirement for the actuation of the valves is comparatively high, since the valves are activated to open in very short succession, in dependence on the frequency of the pulse width modulation and need to be held in an opening manner for a while depending on the sampling degree. Accordingly, the valves must have a very high switching durability.

SUMMARY OF ILLUSTRATIVE EMBODIMENTS

In one aspect, a method for controlling a breathing gas supply to a number of breathing masks in a passenger aircraft is provided. The method includes determining, by processing circuitry, a desired mass flow, a maximal error, and a minimal error; causing, by the processing circuitry, actuation of at least one valve to an open position; and controlling, by the processing circuitry, mass flow of the breathing gas supply to the number of breathing masks. The controlling includes a) monitoring an actual mass flow of breathing gas supply to the number of breathing masks through measurements obtained from a mass flow metering apparatus, b) determining the actual mass flow exceeds the desired mass flow by at least the maximal error, c) responsive to determining the actual mass flow exceeds the desired mass flow, causing actuation of the at least one valve to a closed position, d) continuing monitoring the actual mass flow, e) determining the desired mass flow exceeds the actual mass flow by at least the minimal error, f) responsive to determining the desired mass flow exceeds the actual mass flow, causing actuation of the at least one valve to an open position, and repeating steps (a) through (f).

In one aspect, the at least one valve is a magnetic valve. The actuation of the at least one valve includes supplying a triggering voltage to the at least one valve.

In one aspect, controlling the mass flow of the breathing gas supply to the number of breathing masks further includes monitoring at least one of a cabin pressure and an altitude of the passenger aircraft; and updating, based upon a change in at least one of the cabin pressure and the altitude, one or more of the minimal error, the maximal error, and the desired mass flow.

In one aspect, the minimal error is between 10% and 50% of the desired mass flow and the maximal error is between 10% and 100% of the desired mass flow.

In one aspect, the mass flow metering apparatus includes a nozzle and a pressure sensor. The measurements obtained from the mass flow metering apparatus comprise signals produced by the pressure sensor.

In one aspect, the mass flow metering apparatus comprises a number of meter runs arranged downstream of the valve. Each meter run may include a nozzle, and a pressure transducer.

In one aspect, controlling the mass flow of the breathing gas supply to the number of breathing masks further comprises controlling a respective switch of at least one meter run of the number of meter runs based on at least one of a cabin pressure, an altitude of the passenger aircraft, and the desired mass flow.

In one aspect, the controlling the respective switch comprises enabling at least two meter runs of the number of meter runs in parallel.

In one aspect, a system for controlling an emergency oxygen supply in a passenger aircraft is provided. The system includes a valve disposed between an oxygen source and a number of breathing masks; a means for measuring mass flow disposed between the valve and the number of breathing masks; and processing circuitry. The processing circuitry is configured to determine a desired mass flow, monitor over time an actual mass flow based upon measurements supplied by the means for measuring mass flow, and control opening and closing of the valve, during monitoring, as a function of the desired mass flow and the actual mass flow.

In one aspect, the oxygen source is an oxygen storage device, breathing gas storage device, or an oxygen generator.

In one aspect, the system further includes a pressure sensor and the desired mass flow is determined based on a signal from the pressure sensor.

In one aspect, the controlling the opening and closing of the valve as a function of the desired mass flow and the actual mass flow includes determining a minimal error value and a maximal error value; causing actuation of the valve to a closed position when a difference between the actual flow and the desired flow exceeds the maximal error value; and causing actuation of the valve to an open position when a difference between the desired flow and the actual flow exceeds the minimal error value.

In one aspect, the means for measuring mass flow comprises a means for producing a supersonic flow and a pressure sensor.

In one aspect, the pressure sensor includes a pressure transducer.

In one aspect, the means for measuring mass flow comprises a number of meter runs arranged downstream of the valve. Each meter run includes a means for producing a supersonic flow and a pressure sensor.

In one aspect, the processing circuitry is further configured to actuate at least one switch to enable and disable at least one meter run of the number of meter runs.

In one aspect, the processing circuitry is further configured to determine, prior to actuating the at least one switch, at least one of a change in cabin pressure and a change in altitude. The position of the at least one switch is selected based upon the at least one of the change in cabin pressure and the change in altitude.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIG. 4A, 4B show the detail A of FIGS. 3A and 3B, in an enlarged representation;

DETAILED DESCRIPTION OF ILLUSTRATIVE EMBODIMENTS

When experiencing an emergency decompression, an emergency supply of oxygen is provided to crew and passengers of an aircraft, from compressed oxygen storage containers, or as a result of a chemical reaction between two or more reagents. When the aircraft reaches 10,000 feet the passengers can safely breathe atmospheric air and the emergency supply of oxygen may be stopped. Many land masses extend above 10,000 feet and thus, the aircraft may not descend to 10,000 feet, an alternative yet safe flight profile is possible in which upon decompression the aircraft descends to a safe holding altitude, which would be above, 10,000 feet, and preferably around 25,000 feet, while the passengers and crew are supplied with oxygen enriched gas.

Figure 1:
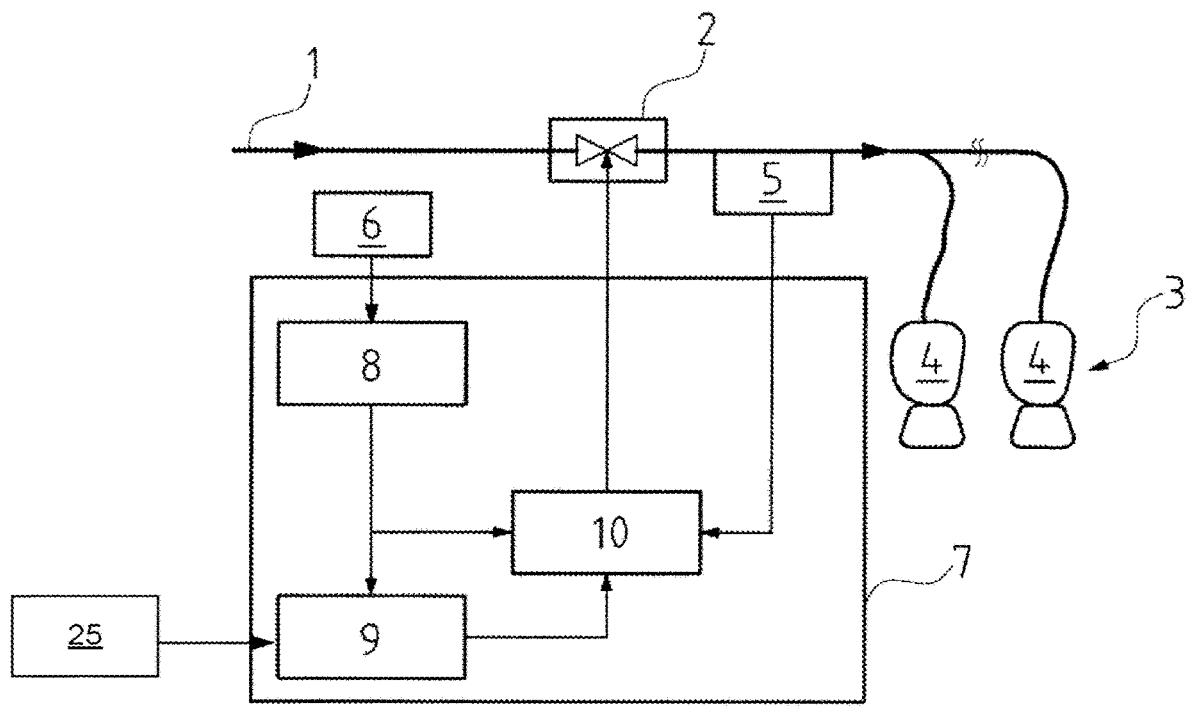
FIG. 1 is a circuit diagram of a device for the emergency oxygen supply in an aircraft.

Referring now to FIG. 1, an emergency oxygen supply device is provided according to one example. Beginning with a pressure-leading conduit 1 for oxygen, which is fed by an oxygen stored device, a compressed gas bottle, or an oxygen producer is connected via a valve 2 (e.g., magnetic latching valve such as a bistable magnet on/off valve) to a group of breathing masks 3, of which here two are shown by way of example. The valve 2 is configured to block or release a conduit connection. In embodiments using a bistable magnet on/off valve 2, the valve provides energy savings since only one switching impulse is produced for switching over the valve. In particular, no further energy is to be supplied, particularly in the opened position, as is otherwise the case with simple magnet valves. The valve may include a permanent magnet and a coil. The latching valve is stable in either shifted state due to the permanent magnet. The valve 2 may stay in either state indefinitely without drawing power. When the valve is energized with a negative pulse (e.g., to the coil), the valve changes from an open to a closed position. When the valve is energized with a positive pulse, the valve changes from a closed position to an open position. The valve 2 is connected to breathing masks 3 via the conduit.

The breathing masks 3 are passenger oxygen masks common in civilian air travel as would be understood by one of ordinary skill in the art. The breathing masks 3, for example, may be provided with a breathing bag 4 arranged upstream as would be understood by one of ordinary skill in the art. The breathing bag 4 represents a buffer for the oxygen supply. In one embodiment, the breathing mask 4 is provided with an auxiliary air valve. In one embodiment, the number of the breathing masks is preferably two to six breathing masks connected to the pressure-leading conduit.

In some embodiments, a flow mass meter 5 is provided in the conduit to the breathing masks 3, at the exit side of the valve 2. The flow mass meter 5, for example, can include a mass flow sensor, a volume sensor, or in another suitable manner as would be understood by one of ordinary skill in the art. The flow mass meter 5, for example, is configured to detect or estimate the actual mass flow of oxygen to the breathing masks 3. The actual mass flow measurement is effected continuously or in sufficiently short intervals, for example between one millisecond to 100 ms.

A control and regulation unit 7 is provided, which controls the magnet valve 2 as a function of both cabin pressure and flow mass to the breathing masks 3. A signal or measurement from the flow mass meter 5, for example, may be supplied to the control and regulation unit 7. In the event of failure of the flow mass meter 5, a default flow may be assumed. For example, the control and regulation unit 7 may adjust setpoints (e.g., desired mass flow, minimal and maximal error values) for maximized mass flow. Thus, a minimum oxygen flow is provided even in a failure case.

In some embodiments, a pressure sensor 6 is provided, which detects the cabin pressure within the aircraft. The pressure sensor 6 may be remotely located, such as within a central control system. The pressure sensor 6 may be connected to one or more control and regulation units. For example, a pressure sensor provided in a main cabin control unit may supply a cabin pressure measurement to the control and regulation unit 7. The pressure sensor 6 may be one of the pressure sensors available in the aircraft, its value being available upon connection to the aircraft communications bus. In other embodiments, a dedicated pressure sensor 6 is provided with the control and regulation unit 7. For example, in order to ensure a reliable reading of the pressure independent of the aircraft bus system, each control and regulation unit 7 may be provided with its own pressure sensor. In further embodiments, upon failure of a dedicated pressure sensor 6, the control and regulation unit 7 may obtain a cabin pressure measurement from a central control system, for example via a central communications bus of the aircraft.

In some embodiments, an altimeter signal or measurement is supplied to the control and regulation unit 7, for example, via an altimeter 25. The altimeter measurement, for example, may be provided by the central aircraft control via the central communications bus. The altimeter signal or measurement may identify a current elevation of travel of the aircraft.

The control and regulation unit 7, in some embodiments, includes a first computation unit 8, a second computation unit 9, and a third computation unit 10. The units described herein may be implemented as either software and/or hardware modules and may be stored in any type of computer-readable medium or other computer storage device. For example, each of the units described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the units described herein. The CPU may execute software instructions written in a programing language such as Java, C, or assembly. One or more software instructions in the modules may be embedded in firmware, such as an erasable programmable read-only memory (EPROM). In one example, the control and regulation unit 7 is formed by a microprocessor.

The first computation unit 8, in some implementations, determines a desired mass flow based on the cabin pressure. The desired mass flow is the flow associated with the cabin pressure, in order to supply the connected breathing masks 3 or the persons connected thereto, with the required quantity of oxygen. The desired mass flow, in some examples, may be determined using values stored in a tabular form, in a curve, or an algorithm. For example, the first computation unit may apply the cabin pressure determined via the pressure sensor 6 to a look-up table to determine the desired mass flow. Since the cabin pressure represents the flight altitude and the oxygen of the surrounding air which results from the flight altitude, in some embodiments, an altimeter reading may be used in addition to or in lieu of the cabin pressure measurement. For example, in the event of failure of the cabin pressure sensor 6, the first computation unit 8 may receive an altimeter reading for determining the desired mass flow.

In some embodiments, the second computation unit 9 determines the desired values (set points) and error values for closed-loop control, as a function of the desired mass flow determined by the first computation unit 8. The mass flow over time is summed in the third computation unit 10 as a function the signal detected by the flow mass meter 5, and the current or actual error value to the desired mass flow is determined. In some implementations, the second computation unit 9 receives input from the altimeter 25 for tracking cruising altitude over time to more accurately determine set points and error values. Further, in certain embodiments, the cabin pressure may be fed to the second computation unit 9 from the pressure sensor 6 for use in estimating cruising altitude over time. For example, when a fault is detected in the pressure sensor 6 (e.g., when the measurements are out of range), the second computation unit 9 may determine the desired values based on values received from the altimeter 25.

A maximal and minimal error value are set, in some embodiments, in the third computation unit 10. When either the maximal or minimal error value is reached, the third computation unit 10 may send a signal to actuate the valve 2. That is, the valve 2 receives a switching impulse for change-over when either the maximal or minimal error value is reached. Determination of maximal and minimal error values is described in greater detail below in relation to FIGS. 3A-C and FIGS. 4A and 4B.

In one embodiment, the control and regulation unit 7 is connected to one valve 2. The number of valves in an aircraft, for example, is in part a function of the number of breathing masks that may be connected to the valve 2 while maintaining adequate pressure for oxygen delivery to the breathing masks 3. The number of masks supplied by each valve, for example, is a function of the maximum oxygen flow of the valve 2. For example, in a large aircraft (e.g., 300 passengers) and assuming three masks are connected to each valve, then a total of one hundred control and regulation units may be used. In other embodiments, fewer control and regulation units may be used, with each control and regulation unit controlling a number of valves presented in parallel, each valve supplying oxygen to a particular bank of breathing masks. In one example, the control and regulation unit 7 may control two or more magnet valves by individually calculating and outputting the desired values to the two or more valves.

Figure 7:
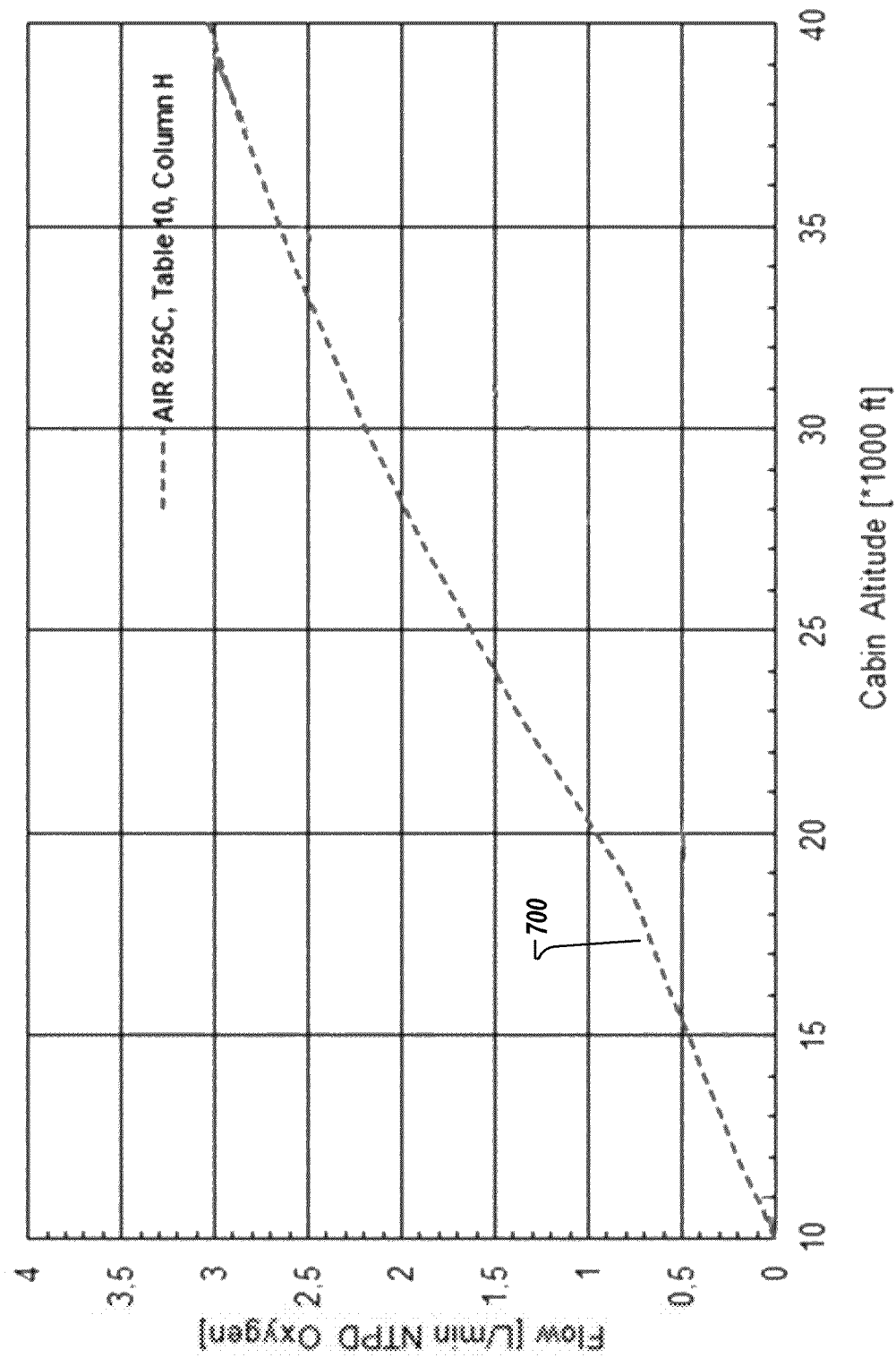
FIG. 7 is a schematic that shows a c-curve of a breathing mask according to one example.

An example oxygen flow of a breathing mask is by c-curve 700 of FIG. 7. Curve 700 shows the flow as a function of the cabin altitude. Curve 700 may be stored in the second computation unit 9. The flow of oxygen per minute is a function of the mask performance. For example, the maximum flow rate may be 3.1 L/min at an altitude of 40,000 feet. The flow rate decreases with the altitude. The flow rate at the holding altitude may be 1 L/min.

Figure 2:
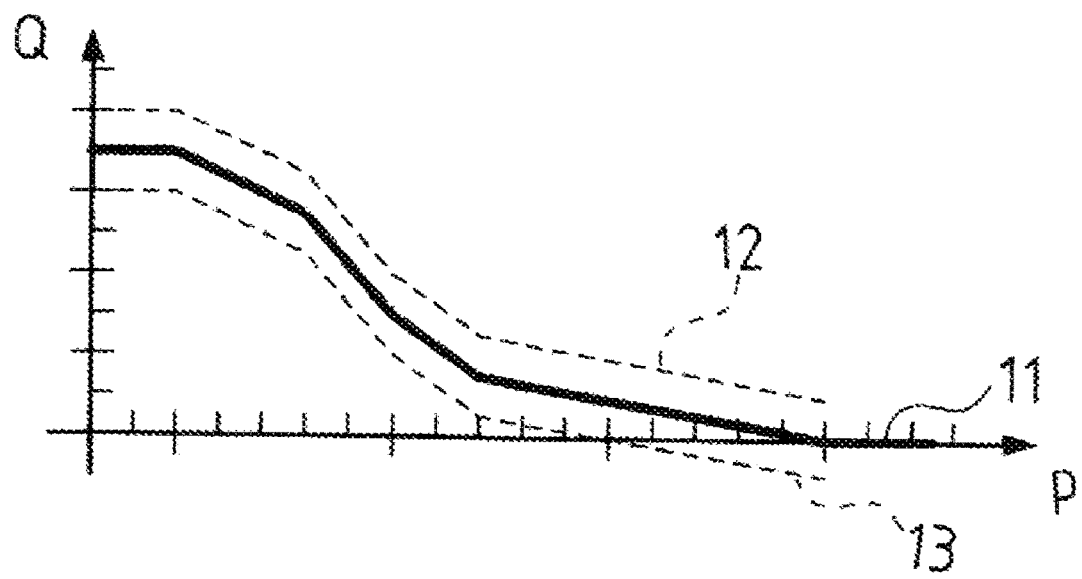
FIG. 2 is a schematic that shows a curve of the desired mass flow in dependence on the cabin pressure.

FIG. 2 is a schematic that shows the desired mass flow as a function of the cabin pressure, which is to say in dependence on the flight altitude or the surrounding pressure. Curve 11 may be stored in the first computation unit 8. A likewise pressure-dependent maximal error is shown by curve 12 and is represented with respect to curve 11. A minimal error is shown by curve 13 and is represented below the curve 11. The curves 12 and 13, as FIG. 2 clearly shows, in their course follow the curve 11 which represents the desired mass flow in dependence on the cabin pressure, but are shifted by a certain amount to the top (curve 12) or to the bottom (curve 13), thus mark the error band or tolerance band around the curve 11. These curves 12 and 13 are stored in the computation unit 10.

Figure 3A:
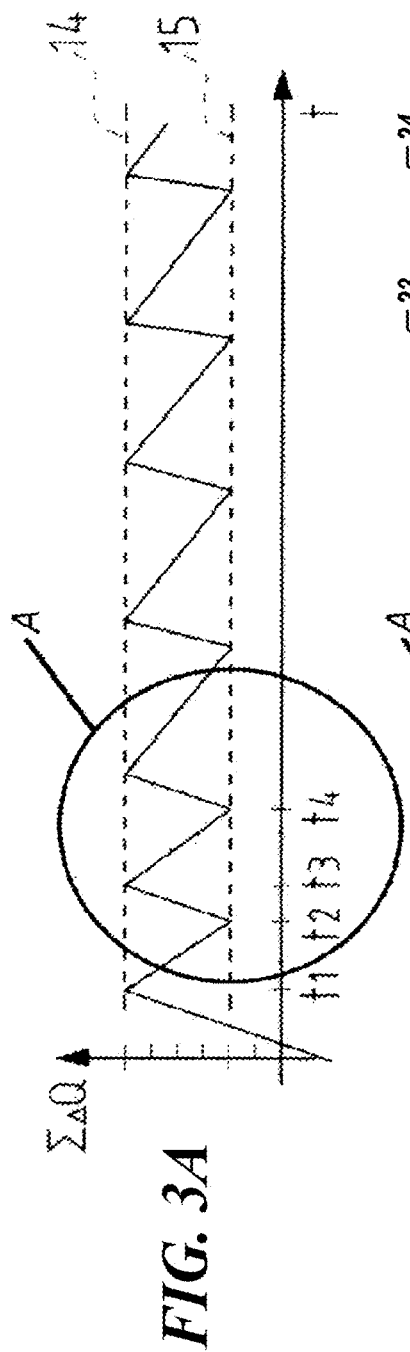
FIG. 3A is an example diagram of the summed actual mass flow.
Figure 3B:
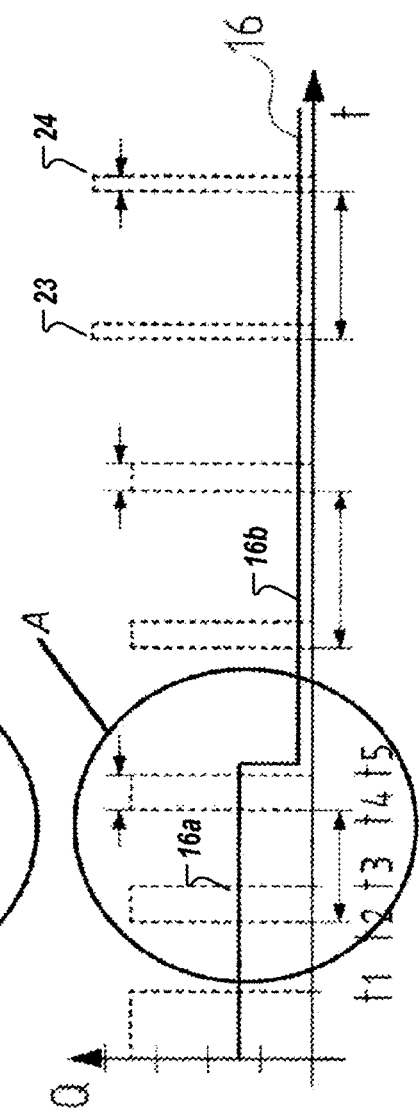
FIG. 3B is an example diagram of the desired mass flow over time.
Figure 3C:
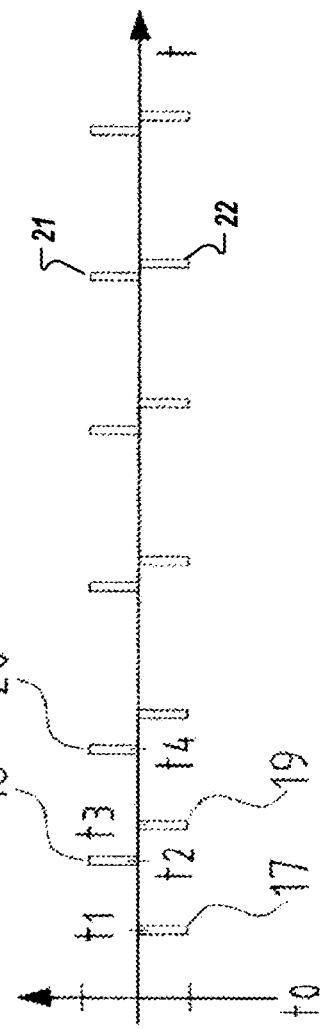
FIG. 3C is an example diagram of the switching impulses for switching over the valve, over time.

The control of the valve 2 is represented in FIGS. 3A-C and FIGS. 4A and B. A maximal error value 14 is derived from the curve 12 and a minimal error value 15 is derived from the curve 13, in FIGS. 3A and 4A respectively. Curve 16 in FIGS. 3B and 4B represents the desired mass flow.

The maximal error value is preferably set between 10% and 100% above the desired mass flow. The greater the maximal error, the lower is the number of switching cycles. The minimal error value preferably lies between 10% and 50% below the desired mass flow. The switching frequency of the valve drops with an increasing minimal error value.

In one embodiment, the error values are selected such that with regard to the temporal average, the actual mass flow corresponds at least to the desired mass flow or is preferably slightly greater, in order to ensure an adequate oxygen supply to the passengers under all circumstances.

In one embodiment, the error values are selected such that after the first cycle, the actual mass flow corresponds to the desired mass flow or is larger than the desired mass flow.

Beginning with the emergency oxygen supply, referencing the system described in relation to FIG. 1, the valve 2 is activated to open firstly at the point in time t0. By way of this, oxygen flows through the conduit 1 and the opened valve 2 to the breathing masks 3. The quantity of the oxygen flowing through is detected via the flow mass sensor 5, and the error value resulting with respect to the desired mass flow is temporally summed in the third computation unit 10. The summing is represented in FIGS. 3A and 4A. Thereby, firstly initially an undersupply is to be ascertained, until, with an opened valve 2, the actual mass flow flowing through the valve has exceeded the desired mass flow and has reached the maximal error value 14. At this point in time t1, the valve 2 is changed-over by way of a switching impulse 17, whereupon it is closed and thus no further oxygen flows to the breathing masks 3.

An increasing error value results with increasing time, which is to say that firstly a reduction of the oversupply of the preceding switching interval, and then an undersupply with respect to the desired value or setpoint 16, until finally this is fallen short of and a minimal error value 15 is reached, which is stored in the control and regulation unit 7, in particular in the third computation unit 10. As soon as the minimal error value 15 has been reached, which is to say when the curve 13 has been reached and is just fallen short off, thus when the minimal error value 15 is reached or just fallen short of with regard to magnitude, specifically at the point in time t2, then the valve 2 is reversed by way of a switching impulse and from now on is opened, so that oxygen flows through the conduit 1 to the breathing masks 3. With this, firstly the past undersupply is covered. Then, with increased time and with an opened valve 2, more oxygen flows through than is envisaged according to the desired value (setpoint) curve 16. This is effected until the mass flow has reached a maximal error value 14, specifically at the point in time t3, and the magnet valve 2 is switched over closed. If thereafter, the desired curve 16 is firstly fallen short of due to an undersupply and finally the minimal error value 15 is reached, at the point in time t4 a switching impulse 20 is issued by the computation unit 10 which switches over the magnet valve 2 which is to say now activates to open, so that the oxygen flows again. This method is continuously repeated so that with a suitable sampling rate, preferably between 1 and 200 ms, here for example 5 ms, an oxygen supply is reached, which practically exactly corresponds to the desired supply.

FIG. 3B shows the desired values at two altitudes. In particular, a first desired value (setpoint) 16a is associated with a first altitude. A second desired value 16b is associated with a second altitude lower than the first altitude. Thus, the first desired value 16a represents a higher flow than the second desired value 16b.

As FIG. 3B in particular shows, on one hand the switching procedures per se are comparatively low, since the valve 2 is merely switched over on reaching a maximum or minimum error, but no high-frequency activation of the valve is necessary, as is common with pulse width modulation. The activation is moreover significantly better adapted to the actual oxygen requirement, since the method is not limited to a frequency and a sampling degree, as is necessary with pulse width modulation.

Further, flows 23, 24 of FIG. 3B show example mass flow at a higher input pressure, therefore the oxygen flow is higher. Thus the upper error value 14 is reached faster and the valve is switched off faster as shown by switching pulses 21 and 22.

The previously described closed-loop control method sums the errors of the control variable for the control of the valve 2. Thereby, the error value is summed into a desired value (setpoint) which is determined in a pressure-dependent manner in the first computation unit 8 of FIG. 1 by way of predefined values. If the error sum reaches the upper error value 14 given an opened valve 2, then the valve 2 is reversed. Only when the error sum reaches the lower defined error value 15 (FIG. 3A) is the valve again switched over and thus opened. Thus it is always only one energy impulse is required for the switching, not for the holding of the opened valve, as can be clearly recognized by way of FIG. 3C which diagrams both positive and negative voltage impulses actuating the valve 2 to accomplish the flow profile of FIG. 3B.

Figure 5:
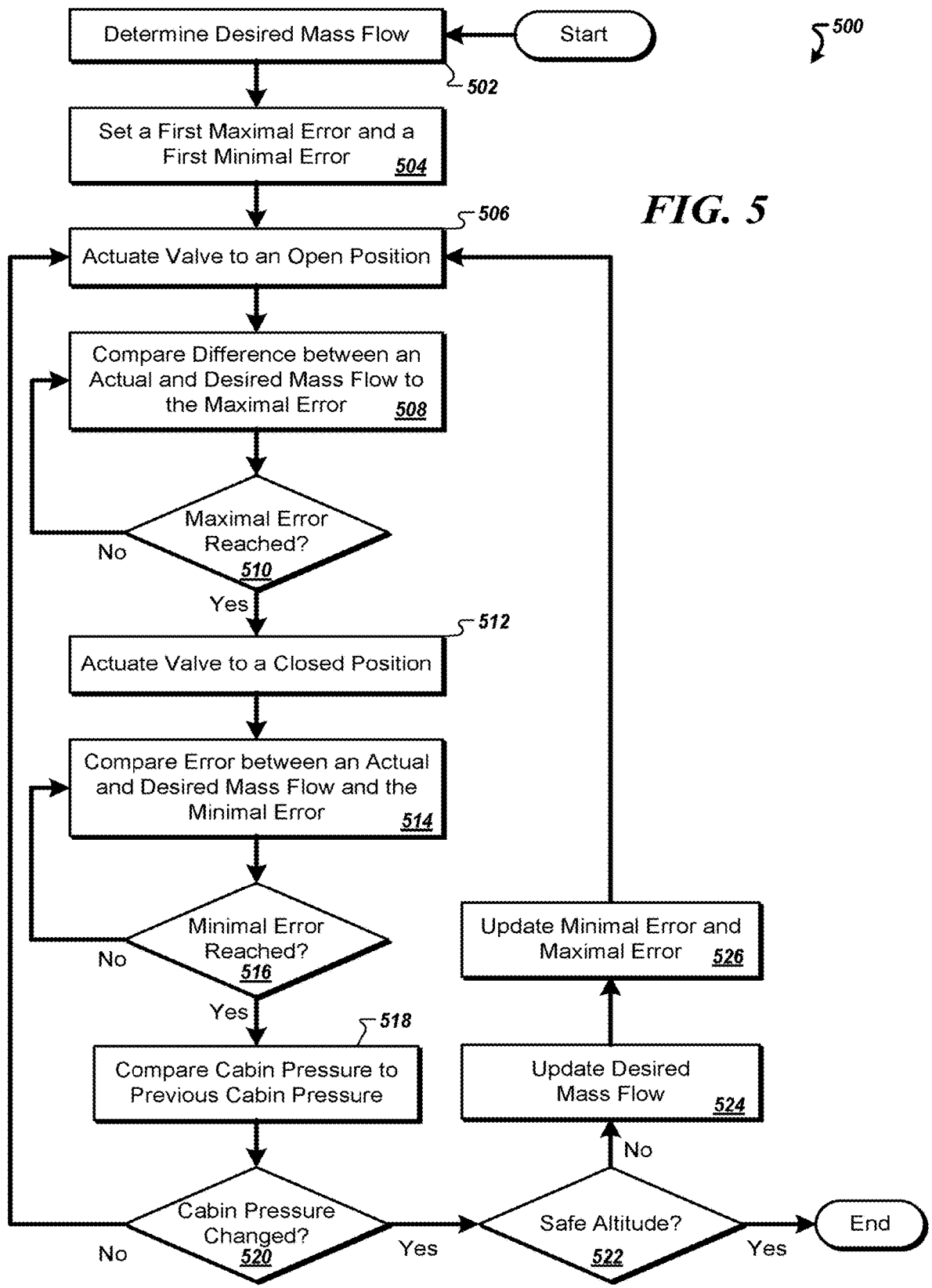
FIG. 5 is a flowchart illustrating a method to control breathing gas supply according to an example.

FIG. 5 is a flowchart illustrating a method 500 to control breathing gas supply when a decompression arises according to an example. The method 500, for example, may be performed by the control and regulation unit 7 described in relation to FIG. 1. The method 500, in a particular example, may be used to effect the flow profile illustrated in FIG. 3B.

In some implementations, the method 500 begins with determining the desired mass flow to initiate oxygen flow (502). As described previously herein, the desired mass flow may be based on the cabin pressure. In one example, when the cabin pressure is not available, for example due to a technical failure, a predefined value may be used. The predefined value may be the desired mass flow associated with an altitude of 35,000 feet. The predefined value may also be determined based on the typical cruising altitude of the aircraft (e.g., based on the flight route) or the aircraft type (e.g., maximum flying altitude of the aircraft). Alternatively, an altimeter reading may be used to estimate cabin pressure based upon a current cruising altitude. The desired mass flow, in one example, is set by the first computation unit 8 of FIG. 1.

In some implementations, a first maximal error (e.g., 50% above the desired mass flow) and a first minimal error (e.g., 10% below the desired mass flow) may be set (504). The first maximal error and the second maximal error, for example, may be determined based on the desired mass flow. The second computation unit 9 of FIG. 1, for example, may set the first maximal error and the first minimal error.

In some implementations, a valve disposed between an oxygen source and a number of oxygen masks is actuated to an open position to begin oxygen flow to the oxygen masks (506). The valve, for example, may be a magnetic valve actuated through a voltage impulse. The trigger mechanism causing the valve to actuate to the open position, for example, may be effected by the third computational unit 10 of FIG. 1.

In some implementations, a difference between an actual mass flow measurement and the desired mass flow is determined (508). The determination may be effected by the third computation unit 10 of FIG. 1. In some embodiments, the actual mass flow measurement is an average of a series of mass flow measurements taken over time, for example to avoid making decisions based upon anomalous or inaccurate measurements. Further, in some embodiments, one or more inaccurate readings (e.g., outside a reasonable or reliable range of measurements) may be discarded in determining the actual mass flow measurement. The difference between the actual mass flow and the desired mass flow may be compared to the maximal error to determine whether the reading is within tolerance.

In some implementations, if the difference between the actual and desired mass flow exceeds the maximal error (510), the valve is actuated to a closed position to stop oxygen flow to the oxygen masks (512). The trigger mechanism causing the valve to actuate to the closed position, for example, may be effected by the third computational unit 10 of FIG. 1.

In some implementations, a difference between an actual mass flow measurement and the desired mass flow is determined (514). The determination, for example, may be effected by the third computation unit 10 of FIG. 1.

In response to determining that the difference between the actual and desired mass flow exceeds the first minimal error (516), in some implementations, it is determined whether there is a change in the cabin pressure (518). The determination may be effected by the first computation unit 8 of FIG. 1 based on measurement received from the pressure sensor 6 of FIG. 1. Alternatively, the determination may be effected based on the flight altitude. The flight altitude may be determined by the altimeter 25 of FIG. 1. Then, a look-up table may be referenced to determine a cabin pressure associated with the flight altitude.

In some implementations, it is determined whether the aircraft is flying at a safe altitude (522). If the cabin pressure and/or altitude, for example, is indicative of a safe cruising altitude for proceeding without emergency oxygen (522), the method 500 may end. For example, at a cruising altitude of 10,000 feet, oxygen levels within the cabin may be adequate without supply of oxygen through the breathing masks. The determination may be effected by the second computation unit 9 based on received altitude measurements. The altitude measurement, for example, may be provided by the altimeter 25 of FIG. 1.

In some implementations, where there is a change in cabin pressure (520) and/or altitude (522), a new desired mass flow is determined (524). For example, the new desired mass flow may be effected by the first computation unit 8 of FIG. 1. In a particular example, a look-up table may be referenced to determine the desired mass flow based on a change in the flight altitude.

In some implementations, the minimal error and maximal error are updated based upon the updated desired mass flow (524). The updated maximal error and the updated minimal error, for example, may be determined based on the new desired mass flow. The second computation unit 9 of FIG. 1, for example, may set the updated maximal error and the updated minimal error.

In some implementations, based upon the minimal error being reached (516), whether or not the cabin pressure has changed (520), as long as the cruising altitude has not yet reached a safe altitude (522), the method 500 returns to actuating the valve to an open position (506) and monitoring the mass flow (508, 510). The mass flow will be monitored, in the circumstance that the cabin pressure and/or altitude changed, based upon the updated desired mass flow (524).

Although described as a particular series of operations, in some implementations, the method 500 may be performed in a different order. For example, in some embodiments, the cruising altitude may be monitored for a safe altitude (522) on an ongoing and/or periodic basis not connected with whether or not the cabin pressure has changed and/or the valve has actuated to the closed position. In another example, in other embodiments, the desired mass flow may be updated (524) prior to actuating the valve to the closed position (512), based upon, for example, a change in cabin pressure and/or cruising altitude. In further embodiments, the first maximal and minimal error values may be determined (504) before determining the desired mass flow (502). For example, the second computation unit 9 of FIG. 1, may set the first maximal error and the first minimal error as a function of the cabin pressure by referencing a look-up table. In additional embodiments, the first maximal and minimal error values may be determined (504) independently from the desired mass flow (502) and the cabin pressure. Thus, the first maximal and minimal error values may be predefined values. Thus, the maximal and minimal error values may not be updated upon the updated desired mass flow (524).

In some implementations, more or fewer steps may be included in the method 500. For example, in some embodiments, once a predetermined period has elapsed, a predefined holding altitude (e.g., 25,000 feet) is assumed. Thus, the desired mass flow is set to the mass flow associated with the predefined holding altitude. For example, a 6,000 feet/minute rapid descent may be assumed and the predetermined period may be set to 5 minutes.

The methods and systems according to the present disclosure is thus not to modulate the sampling degree of the rectangular impulse, thus the width of the impulse, at a constant frequency, as with the state of the art, but to firstly activate the valve in an opening manner until the error between the actual mass flow and the pressure-dependently set desired mass flow and which is summed over time exceeds a previously fixed maximum error value. That is, to hold the valve open for so long until more oxygen has been supplied to the breathing mask or breathing masks, than this would be necessary in a manner dependent on cabin pressure. Only when the actual mass flow, which means to say the oxygen quantity which is summed over time exceeds the desired oxygen quantity envisaged for this time by a certain amount, thus by a maximal error valve, is the valve then changed over, in order in a second method step to activate this in a closing manner until the error between the actual mass flow and the desired mass flow and which is summed over time exceeds a minimal error value, which means in order to keep the valve closed until less oxygen has been fed to the breathing mask or breathing masks than would be necessary in a manner dependent on cabin pressure, whereupon the cycle is repeated beginning with actuating the valve to an open position. Thereby, that which has been supplied in excess or that which has been supplied too little is taken into account with the subsequent method step. It is evident that the oxygen quantity which has been previously fed in excess due to the fixed error value is taken into account with the subsequent method step, in which the valve is activated to close, by way of the alternating changing-over of the valve, so that a very high closed-loop control accuracy can be achieved despite the comparatively short switching cycle number.

In some implementations, the methods and systems may be based on volume values (detected by volumetric flow detection). For example, an actual volume flow and a desired volume flow.

The methods and systems described herein can also be used without any problem if the desired mass flow changes, if for example the aircraft is in descent, since then the maximal and the minimal error value according to the curves 12 and 13 are adapted, and due to the summing of the error values, it is always ensured that the desired mass flow is also achieved. This closed-loop control is largely insensitive to disturbance parameters and avoids the inherent problems of a PID closed loop control as is typically applied with the state of the art.

Since flow sensors (e.g., flow mass meter 5) are technologically comparatively complicated, according to a further development of the disclosure, it can be advantageous to arrange a valve downstream of the valve 2 (FIG. 1) and to dimension the valve downstream (e.g., nozzle, orifice) in a manner such that a supersonic flow, i.e. overcritical flow, with which the flow quantity is essentially proportional to the pressure prevailing at the nozzle, sets in with the expected operating range. Then, a pressure sensor is advantageously arranged between the on/off valve and the nozzle. The actual mass flow is determined as a function of the temporal course of the pressure. The pressure in front of the nozzle is essentially proportional to the mass flow, i.e. the mass stream through the nozzle, so that the mass flow to the passenger oxygen masks can be determined by way of the pressure.

Figure 6A:
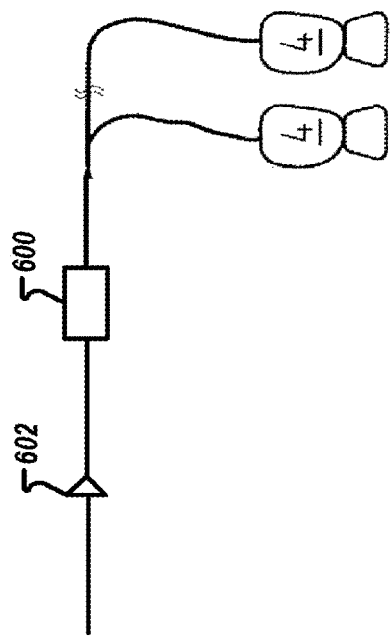
FIG. 6A, 6B show circuit diagrams of a system for measuring the flow of oxygen according to one example.

Referring now to FIG. 6A, a pressure metering run is shown. The pressure metering run may include a pressure transducer 600 and an orifice 602. The pressure metering run is positioned at the exit side of the valve 2. The performance of the orifice meter system is a function of the precision of the orifice (or nozzle) and the accuracy of the pressure transducer. At low flow rates, the errors in the pressure transducer measurement can lead to a large error in the actual flow rates. For this reason, in some embodiments, two or more pressure metering runs are provided.

In some embodiments, the multiple pressure metering runs are operated in parallel. In this example, when the total flow is great all pressure metering runs are operated and the flow rates are summed to yield a total flow measurement. When the total flow rate decreases, individual pressure metering runs may be disabled, resulting in increased flow rates through the remaining pressure metering runs. Each pressure metering run may be controlled using a switch 604.

In other embodiments, multiple pressure metering runs are operated in serial. In this example, when the total flow exceeds the functional parameters of a first (low flow rate) pressure metering run, the system may switch to using a second (higher flow rate) pressure metering run. The operational range of flow rate for each pressure metering run, for example, may be a function of the size of the nozzle.

Figure 6B:
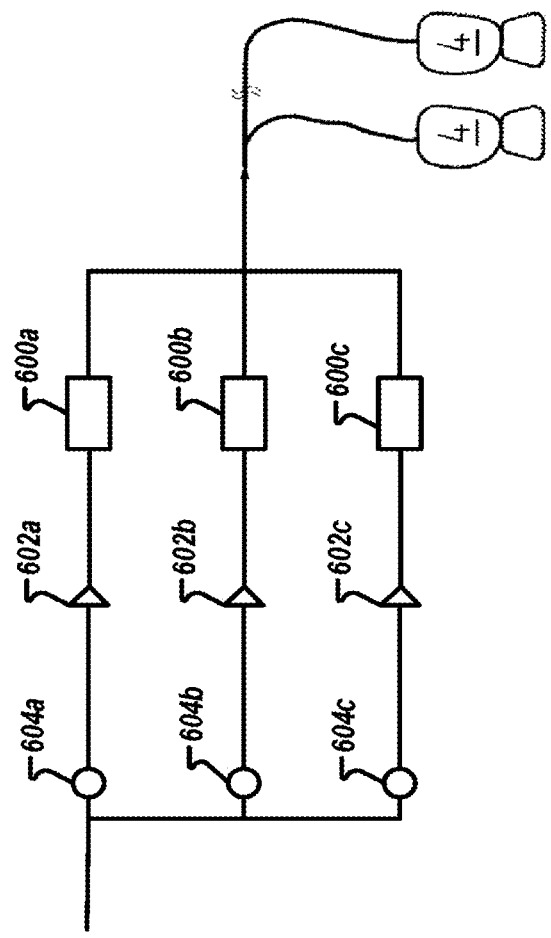

Referring now to FIG. 6B, three pressure metering runs are shown. The control and regulation unit 7, for example, may activate/deactivate the pressure metering runs as a function of the altitude. The orifices 602a, 602b, 602c, in some embodiments, have equal diameter. In other embodiments, each of the orifices may be of different diameter. In one embodiment, the diameter of the first orifice 26a may be associated with a mass flow associated with a first altitude range and the second orifice 26b may be associated with a mass flow associated with a second altitude range. Thus, the control and regulation may activate switch 604a or 604b based on the current altitude.

The orifice may be a simple orifice to constrain the oxygen enriched gas to flow, or may include a variable orifice the cross section of which may be varied according to operating conditions, by for example, the control and regulation unit 7.

In some embodiments, two or more differential pressure transducers may be used in parallel for each orifice. Each of the two or more differential pressure transducers may be configured for a different flow rate (i.e., one for low flow, another for high flow).

The method described herein can reduce the switching frequency of the on/off valve in comparison to known methods. Thus, valves with lower switching reliability can be employed, or with the same switching reliability ensures an increased safety from failure.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A method for controlling a breathing gas supply to a plurality of breathing masks in a passenger aircraft, the method comprising:
    determining, by processing circuitry, a desired mass flow, a maximal error, and a minimal error;
    causing, by the processing circuitry, actuation of at least one valve to an open position; and
    controlling, by the processing circuitry, mass flow of the breathing gas supply to the plurality of breathing masks, wherein controlling comprises
    a) monitoring an actual mass flow of breathing gas supply to the plurality of breathing masks through measurements obtained from a mass flow metering apparatus,
    b) determining the actual mass flow exceeds the desired mass flow by at least the maximal error,
    c) responsive to determining the actual mass flow exceeds the desired mass flow, causing actuation of the at least one valve to a closed position,
    d) continuing monitoring the actual mass flow,
    e) determining the desired mass flow exceeds the actual mass flow by at least the minimal error,
    f) responsive to determining the desired mass flow exceeds the actual mass flow, causing actuation of the at least one valve to the open position, and
    repeating steps (a) through (f).

2. The method of claim 1, wherein the at least one valve is a magnetic valve, and causing actuation of the at least one valve comprises supplying a triggering voltage to the at least one valve.

3. The method of claim 1, wherein controlling the mass flow of the breathing gas supply to the plurality of breathing masks further comprises:

monitoring at least one of a cabin pressure and an altitude of the passenger aircraft; and updating, based upon a change in at least one of the cabin pressure and the altitude, one or more of the minimal error, the maximal error, and the desired mass flow.

4. The method of claim 1, wherein the minimal error is between 10% and 50% of the desired mass flow and the maximal error is between 10% and 100% of the desired mass flow.

5. The method of claim 1, wherein the mass flow metering apparatus comprises a nozzle and a pressure sensor, and the measurements obtained from the mass flow metering apparatus comprise signals produced by the pressure sensor.

6. The method of claim 5, wherein the mass flow metering apparatus comprises a plurality of pressure metering runs arranged downstream of the valve, each pressure metering run including a respective nozzle, and a respective pressure sensor.

7. The method of claim 6, wherein controlling the mass flow of the breathing gas supply to the plurality of breathing masks further comprises controlling a respective switch of at least one pressure metering run of the plurality of pressure metering runs based on at least one of a cabin pressure, an altitude of the passenger aircraft, and the desired mass flow.

8. The method of claim 7, wherein controlling the respective switch comprises enabling at least two pressure metering runs of the plurality of pressure metering runs in parallel.

9. A system for controlling an emergency oxygen supply in a passenger aircraft, the system comprising:
    a valve disposed between an oxygen source and a plurality of breathing masks;
    a means for measuring mass flow disposed between the valve and the plurality of breathing masks; and
    processing circuitry configured to
    determine a desired mass flow,
    monitor over time an actual mass flow based upon measurements supplied by the means for measuring mass flow, and
    control opening and closing of the valve, during monitoring, as a function of the desired mass flow and the actual mass flow by:
    determining a minimal error value and a maximal error value;
    causing actuation of the valve to a closed position when a difference between the actual mass flow and the desired mass flow exceeds the maximal error value; and
    causing actuation of the valve to an open position when a difference between the desired mass flow and the actual mass flow exceeds the minimal error value.

10. The system of claim 9, wherein the oxygen source is an oxygen storage device, breathing gas storage device, or an oxygen generator.

11. The system of claim 9, further comprising:
    a pressure sensor; and
    wherein the desired mass flow is determined based on a signal from the pressure sensor.

12. The system of claim 9, wherein the means for measuring mass flow comprises a means for producing a supersonic flow and a pressure sensor.

13. The system of claim 12, wherein the pressure sensor comprises a pressure transducer.

14. The system of claim 12, wherein the means for measuring mass flow comprises a plurality of pressure metering runs arranged downstream of the valve, each pressure metering run including a respective means for producing a supersonic flow and a respective pressure sensor.

15. A system for controlling an emergency oxygen supply in a passenger aircraft, the system comprising:
    a valve disposed between an oxygen source and a plurality of breathing masks;
    a means for measuring mass flow disposed between the valve and the plurality of breathing masks, wherein the means for measuring mass flow comprises a plurality of pressure metering runs arranged downstream of the valve, each pressure metering run including a means for producing a supersonic flow and a pressure sensor; and
    processing circuitry configured to
    determine a desired mass flow,
    monitor over time an actual mass flow based upon measurements supplied by the means for measuring mass flow, and
    control opening and closing of the valve, during monitoring, as a function of the desired mass flow and the actual mass flow;
    wherein the processing circuitry is configured to actuate at least one switch to enable and disable at least one pressure metering run of the means for measuring mass flow.

16. The system of claim 15, wherein the processing circuitry is configured to determine, prior to actuating the at least one switch, at least one of a change in cabin pressure and a change in altitude, wherein a position of the at least one switch is selected based upon the at least one of the change in cabin pressure and the change in altitude.

* * * * *